(12) United States Patent
Gibson et al.

(10) Patent No.: US 6,985,447 B2
(45) Date of Patent: Jan. 10, 2006

(54) LABEL SWITCHED TRAFFIC ROUTING AND SIGNALING IN A LABEL SWITCHED COMMUNICATION PACKET NETWORK

(75) Inventors: Mark Gibson, Bishops Stortford (GB); Roy Mauger, Herts (GB); Dave Stacey, Herts (GB); Robert Friskney, Harlow (GB)

(73) Assignee: Nortel Networks Limited, St. Laurent (CA)

( * ) Notice: Subject to any disclaimer, the term of this patent is extended or adjusted under 35 U.S.C. 154(b) by 773 days.

(21) Appl. No.: 09/751,058

(22) Filed: Dec. 29, 2000

(65) Prior Publication Data

US 2002/0085559 A1 Jul. 4, 2002

Related U.S. Application Data

(60) Provisional application No. 60/242,270, filed on Oct. 20, 2000.

(51) Int. Cl.
*H04L 12/28* (2006.01)

(52) U.S. Cl. ................................. 370/255; 370/400
(58) Field of Classification Search ........ 370/229–238, 370/351–354, 356, 389, 390–393, 396–395.32, 370/400, 403, 409, 410, 465–469, 254, 255, 370/401; 709/283–292, 245, 295
See application file for complete search history.

(56) References Cited

U.S. PATENT DOCUMENTS

| | | | |
|---|---|---|---|
| 6,336,129 B1 * | 1/2002 | Ise et al. ..................... 709/201 |
| 6,339,595 B1 * | 1/2002 | Rekhter et al. ............. 370/392 |
| 6,366,577 B1 * | 4/2002 | Donovan ..................... 370/352 |
| 6,374,303 B1 * | 4/2002 | Armitage et al. ........... 709/242 |
| 6,408,001 B1 * | 6/2002 | Chuah et al. ............... 370/392 |
| 6,529,958 B1 * | 3/2003 | Oba et al. ................... 709/237 |
| 6,538,991 B1 * | 3/2003 | Kodialam et al. .......... 370/229 |
| 6,603,756 B1 * | 8/2003 | Tappan ....................... 370/351 |
| 6,621,793 B2 * | 9/2003 | Widegren et al. ........ 370/230.1 |
| 6,628,649 B1 * | 9/2003 | Raj et al. .................... 370/360 |
| 6,708,209 B1 * | 3/2004 | Ebata et al. ................ 709/223 |
| 2002/0093954 A1 * | 7/2002 | Weil et al. .................. 370/389 |

* cited by examiner

*Primary Examiner*—Bob Phunkulh
*Assistant Examiner*—Ian N. Moore
(74) *Attorney, Agent, or Firm*—Barnes & Thornburg

(57) ABSTRACT

Label switched paths are installed in a label switched communications packet network. Paths are selected by defining and installing partial routes each having two or more paths such that an end-to-end route across the network can be defined as the concatenation of two partial routes. Signalling to select a path is effected by sending a path message from an end point to a first virtual router, determining a path from the end point to the virtual router, and forwarding an identity of the path to a second virtual router. The second virtual router determines a routing vector across the network, and returns information identifying the routing vector to the first virtual router.

18 Claims, 11 Drawing Sheets

- Use the label assigned to an MPLS LSP as a vector quantity
- Use a stack of such labels to form a vector describing path across a network
- For paths across the illustrated network, the following label stacks would be used:
  - A to D → 2i◇2o/4i
  - B to C → 1i◇1o/3i
  - B to D → 1i◇1o/4i
- Per-LSP bandwidth monitoring permits accurate edge allocation of traffic to each path vector

LABEL SWITCHED TRAFFIC ROUTING AND SIGNALING IN A LABEL SWITCHED COMMUNICATION PACKET NETWORK

RELATED APPLICATION

This application is the non-provisional filing of U.S. provisional application No. 60/242,270 filed on 20 Oct. 2000.

FIELD OF THE INVENTION

This invention relates to methods and apparatus for routing traffic in a label switched communications network.

BACKGROUND OF THE INVENTION

An increasing volume of communications traffic is being carried by packet networks, in particular Internet Protocol (IP) networks. In such networks the user traffic is contained in packets, each of which is provided with a header containing information whereby the packet is routed to its destination. A significant problem with IP networks is that of transporting high priority real time traffic, for example voice traffic, and of providing the quality of service guarantees that are currently being demanded.

A recent development in the communications field which addresses this issue has been the introduction of label switched networks, and in particular networks that operate via the multi-protocol label switching (MPLS) protocol. Such networks comprise an arrangement of routers and links in which quality of service tunnels are defined. Packets are routed across the network by attaching label stacks to those packets indicative of the tunnels through which the packets will pass.

A particular problem that is being faced by network operators is the growth of networks in both complexity and size, and in the consequent difficulty of managing such networks. A potential solution to this problem is to partition a very large network into a number of autonomous domains or systems each of which operates substantially as an individual network. However, partitioning techniques employed have impaired the efficiency of current autodiscovery mechanisms. A possible approach to this problem is the use of dynamic partitioning. However, there is at present no mechanism for providing in an MPLS network a multi-layer switching capability that could provide this dynamic partitioning, i.e. the ability to define a label stack for MPLS such that aspects of hierarchy can be hidden from switches operating at different layers.

SUMMARY OF THE INVENTION

An object of the invention is to minimize or to overcome the above disadvantage.

According to a first aspect of the invention, there is provided a method of routing traffic in a packet network in which label switched paths are installed, the method comprising defining and installing partial routes each comprising two or more paths such that an end-to-end route across the network can be defined as the concatenation of two partial routes.

Preferably, the paths are MPLS LSPs (label switched paths) and the partial routes are cross-connections in MPLS nodes.

The paths and partial routes may be installed using the COPS (common open policy service) protocol.

Typically, the routes are installed for the purposes of forwarding Internet Protocol traffic. The partial routes may be selected based on congestion measurements to achieve traffic engineering objectives.

Advantageously, the routes are selected in order to provide guaranteed QoS for a packet stream.

In another aspect, the invention provides a method of operating a multi-protocol label switched packet network, the method comprising partitioning the network by using constraint based routing to install label switched paths and corresponding labels, and multiplexing sessions by applying cross connections at a higher label level.

Advantageously, the method is embodied as software in machine readable form on a storage medium According to a further aspect of the invention, there is provided a method of signalling to provide source routing in a packet network, the method comprising; sending a path message from an end point to a first virtual router, determining a path, forwarding the path identity to a second virtual router, determining a routing vector across the network, and returning information identifying said routing vector to the first virtual router.

A routing vector is defined as a partial route, which is installed as a cross-connection.

The methods may be embodied in the form of software in machine readable form on a storage medium.

Advantageously, the network is a five stage network of known sized trunks whose topology is controlled by and thus known by a management layer.

According to a further aspect of the invention, there is provided a method of signalling to establish an end to end path in a multi-protocol label switched packet network, the method comprising sending path reservation requests as tunnelled resource reservation protocol (RSVP) messages between first and second virtual routers According to another aspect of the invention, there is provided a label switched communications packet network in which label switched paths are installed, the network including path selection means for defining and installing partial routes each comprising two or more paths such that an end-to-end route across the network can be defined as the concatenation of two partial routes

BRIEF DESCRIPTION OF THE DRAWINGS

Embodiments of the invention will now be described with reference to the accompanying drawings in which.

DESCRIPTION OF PREFERRED EMBODIMENTS

Figure 1:
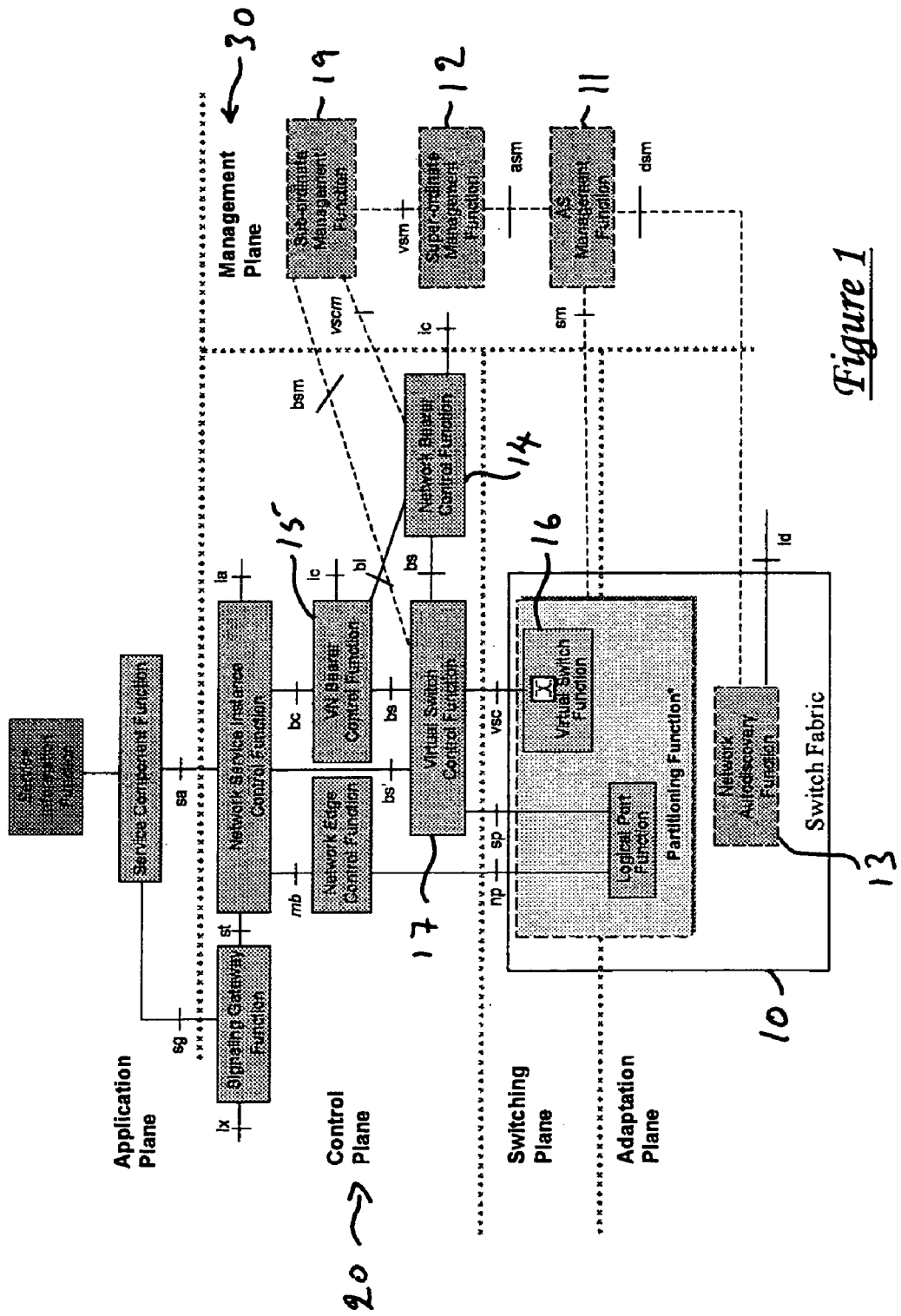
FIG. 1 illustrates schematically a multi-protocol label switched network according to a preferred embodiment of the invention.

The exemplary functional model shown in FIG. 1 incorporates a switch fabric 10 controlled via a control plane 20 and a management plane 30. Multi-domain operation is achieved by means of an autonomous system (AS) management function 11. This receives information from autodiscovery and distils an abstract node representation of the domain for use by the super-ordinate management function 12. A network autodiscovery function 13 operates on the base fabric and populates the AS (autonomous system) management function 11.

Multilayer switching is represented by distinguishing between a network bearer control function 14 which operates on the whole MPLS network and a virtual network bearer control function 15 which operates within a network of virtual MPLS switches.

In the network of FIG. 1, the virtual switch concept is extended such that virtual switches 16 configured in the base fabric 10 via the sm reference point can be further dynamically partitioned into virtual switches, which are allocated to instances of the control plane 20. The first layer of partitioning could be used to segregate an ATM/MPLS "ships in the night" fabric into its two parts or an optical fabric into a MPLS part and a SONET/SDH part. The second layer of partitioning allows multiple instances of the MSF control plane architecture. The first layer of partitioning follows the principles of the sm and vsc reference points without change, the second layer of partitioning is achieved by using policy to control the network bearer control function 15 and the virtual switch control function 17: this maps onto the existing vscm and bs reference points. Additional reference points are identified, i.e. bsm which operates exactly as bs but is used by management to install semi-permanent cross-connects and bi which is between layers of the bearer control function. In the drawing of FIG. 1, the interfaces identified by lower case letters correspond to the interfaces of the MSF (Multiservice Switching Forum) model.

FUNCTIONAL MODEL OPERATION

We have found that dynamic partitioning allows an MPLS network to create partitions by using constraint-based routing to install LSPs and their corresponding labels, sessions can then be multiplexed into the established LSPs by applying cross-connections at the next level of label. A label stack, installed at the edge of the network, can act as a source route so that pre-installed cross-connections achieve dynamic multiplexing into the pre-established LSPs; this provides implicit switching.

DYNAMIC PARTITIONING

The operation of the functional model to achieve dynamic partitioning is as follows:
  On installation of a fabric, the network autodiscovery function 13 exchanges autodiscovery messages with other nodes in the network over the id reference point: this could use the LDP (label distribution protocol) or OSPF protocols. This operation continues on a regular basis until the fabric is decommissioned.
  When new nodes and links are discovered then the autonomous system (AS) management function 11 is informed over the dsm reference point.

The autonomous system management function deduces the abstract node representation of the network and passes this to the super-ordinate management function 12 over the asm reference point. For instance if another carrier is used for transparent MPLS service then the autonomous system (AS) of this carrier would be represented as a single abstract node with its points of access to the MPLS-MSF network.

The super-ordinate management function 12 decides which nodes in the MPLS physical network should host the virtual switch functions for an instance of an MSF control plane. It then defines a flexible SLA (service level agreement) for a label switched path (LSP) between each of these virtual switch nodes according to an interconnection plan. Virtual switches may be configured as multistage networks. A flexible SLA may define traffic contracts that are changed on a time of day basis. These flexible SLAs are passed to the sub-ordinate management function 19 over the vsm reference point.

The sub-ordinate management function 19 installs LSPs and therefore creates a second level virtual switch; it does this by invoking the network bearer control function (NBCF) 14 to run CR-LDP or RSVP-TE over the network ic reference point. COPS is used over the vscm reference point in order to pass a constraint specification to the network bearer control function 14 to allow the constraint based routing to function. This operation is repeated as required in order to modify the LSPs according to the requirements of the flexible SLA.

The network bearer control function 14 installs the LSP and notifies the virtual switch control function (VSCF) 17 of its existence over the bs reference point. The sub-ordinate management function 19 is able to use the bsm reference point in order to install semi-permanent cross-connections to allow the application of implicit switching. COPS allows a policy enforcement point (PEP) such as a VSCF (virtual switch control function) to be controlled by multiple policy decision points (PDP) such as the sub-ordinate management function 19 for different aspects of policy. The VSCF is thus able to support multiple reference points for policy control if COPS is used.

MPLS SOURCE ROUTING

Figure 2A:
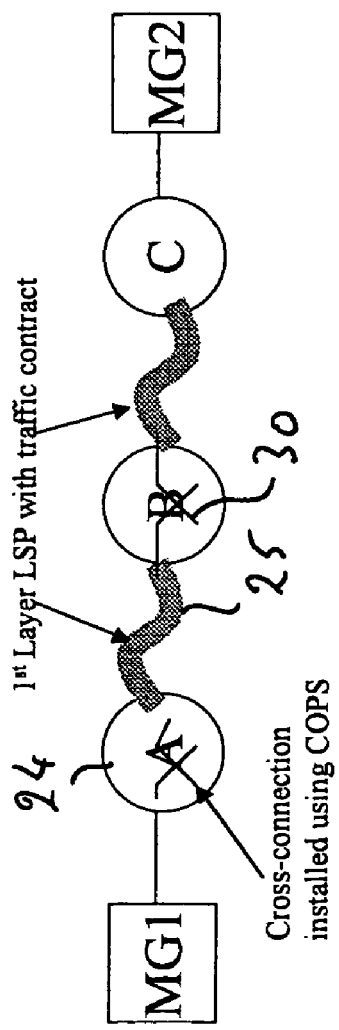
FIG. 2 illustrates MPLS routing in a three stage MPLS network.
Figure 2B:
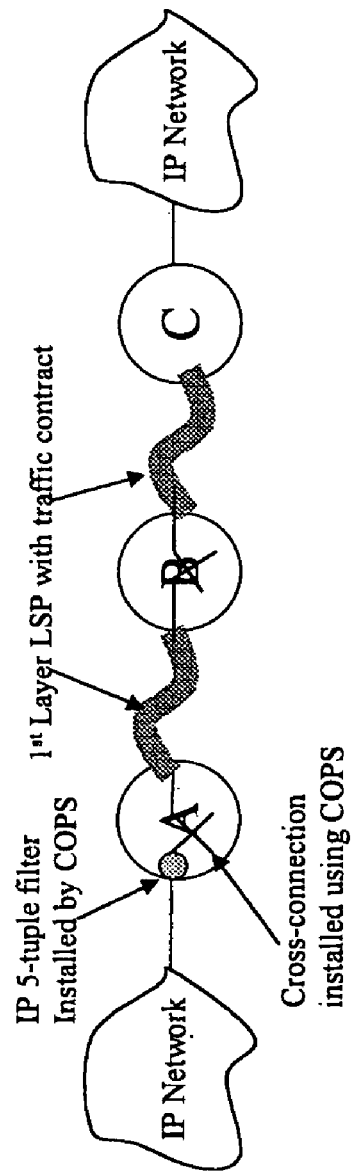

It is possible to use MPLS in a source routing mode in which a source route is embodied by a series of point-to-point LSPs. A particular series of LSPs can be defined by a label stack. Each label is popped at the end of the LSP exposing the next label, which identifies the next LSP. Two examples are shown in FIGS. 2A and 2B. Both figures represent three-stage networks, one (FIG. 2A) connected to Media Gateways the other (FIG. 2B) connecting directly to IP networks. In these figures, the nodes 24 are coupled by first layer label switched paths 25 with traffic contracts. Cross connects 30 are installed in the nodes using COPS.

In FIG. 2A, the first layer LSPs 21 act as the RSVP equivalent to trunk groups. A route is defined as a series of two LSPs, so that if there are e.g. one hundred destinations such as C and ten optional intermediate routers such as B, then there are one thousand possible routes. In the Media Gateway case a semi-permanent cross-connection is installed at A for each route between an input label and a pair of labels, which define the route comprising the output label of the first LSP and the input label of the second LSP. A semi-permanent cross-connect is also installed at B for each route. If media gateway MG1 initiates a new session then a route is selected which has sufficient bandwidth in both its LSPs and the label for that route is passed to the media gateway. All media session packets are routed with guaranteed QoS to C where they can be onward routed either by IP routing or over a further stage of MPLS source routing. The case of IP ports is very similar except that a cross-connection is established for each session between an IP 5-tuple filter which identifies the media session traffic and the label stack which identifies the route. This is illustrated in FIG. 2B.

In a modification of this technique, source routing can also be applied to achieve the functional equivalent of the MPLS multipoint-to-point LSP. This is illustrated in the schematic diagram of FIG. 3.

At each edge node, a cross-connect 30 is installed between an IP filter 31 for the forwarding equivalence class (FEC) of the route and the two-label stack which defines the route. At node B, two cross-connects 32, 33 are installed between the input label switched paths (LSPs) from A1 and A2 to the output LSP to node C. In the illustrated example interface specific labels are assumed. If a platform wide label was used, the same effect could be achieved with a single cross-connect.

Figure 4:
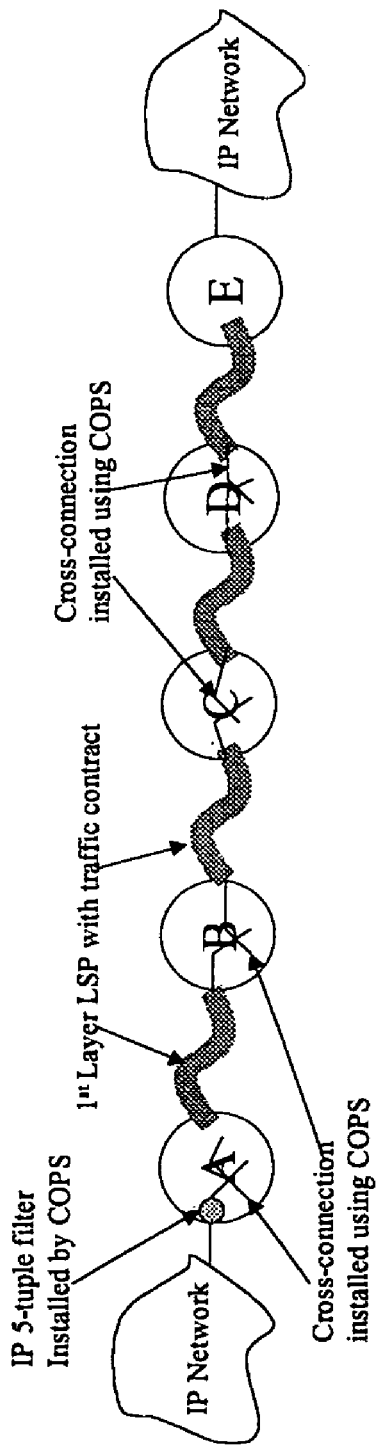
FIG. 4 illustrates implicit switching in a five stage MPLS network.
Figure 5:
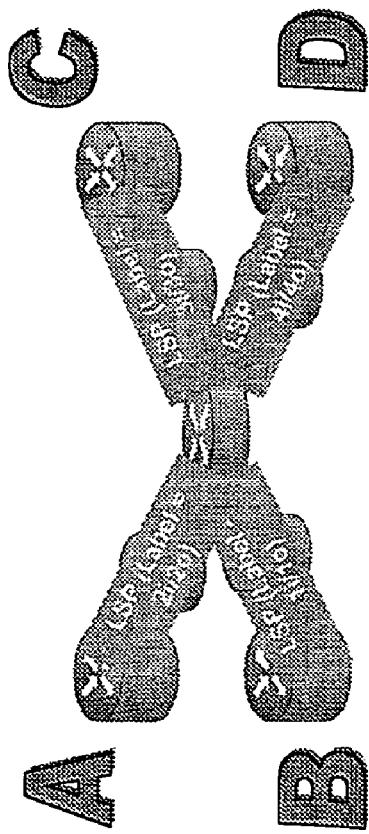
FIG. 5 illustrates the concept of routing vectors.

The scheme can be extended to many stages, a five-stage example being shown in schematic form in FIG. 4. In this case nodes B and D act as local gateways to the national and international gateways at nodes such as C. Suppose for example that there are one thousand destinations such as E, two local gateways at each end such as B and D and fifty national or international gateways such as C. The number of possible routes is very high. In order to manage the routes the problem is treated as a concatenation of two three stage networks. This is effected using the concept of routing vectors as illustrated in FIG. 5.

A routing vector (FIG. 5) is defined as a partial route, which is installed as a cross-connection. Thus in the five-stage example of FIG. 5, a first routing vector from A→C would be installed per session at A and a second Routing Vector for C→E would be installed at C. Routing vectors can be identified as objects and passed in signalling messages. Routing vectors have input labels so they can be invoked by a label at the appropriate point in a stack. The examplary five-stage network would require one hundred routing vectors to be installed at A and two thousand installed at C to cover all of the possible routes. It would be possible to install a second level LSP without a traffic contract to perform the same function as the Routing Vector however RSVP-TE does not explicitly support the installation of such LSPs at this stage. The Routing Vector method is neutral to the use of CR-LDP or RSVP-TE. The process steps embodied in the arrangement of FIG. 5 are as follows.

Figure 6:
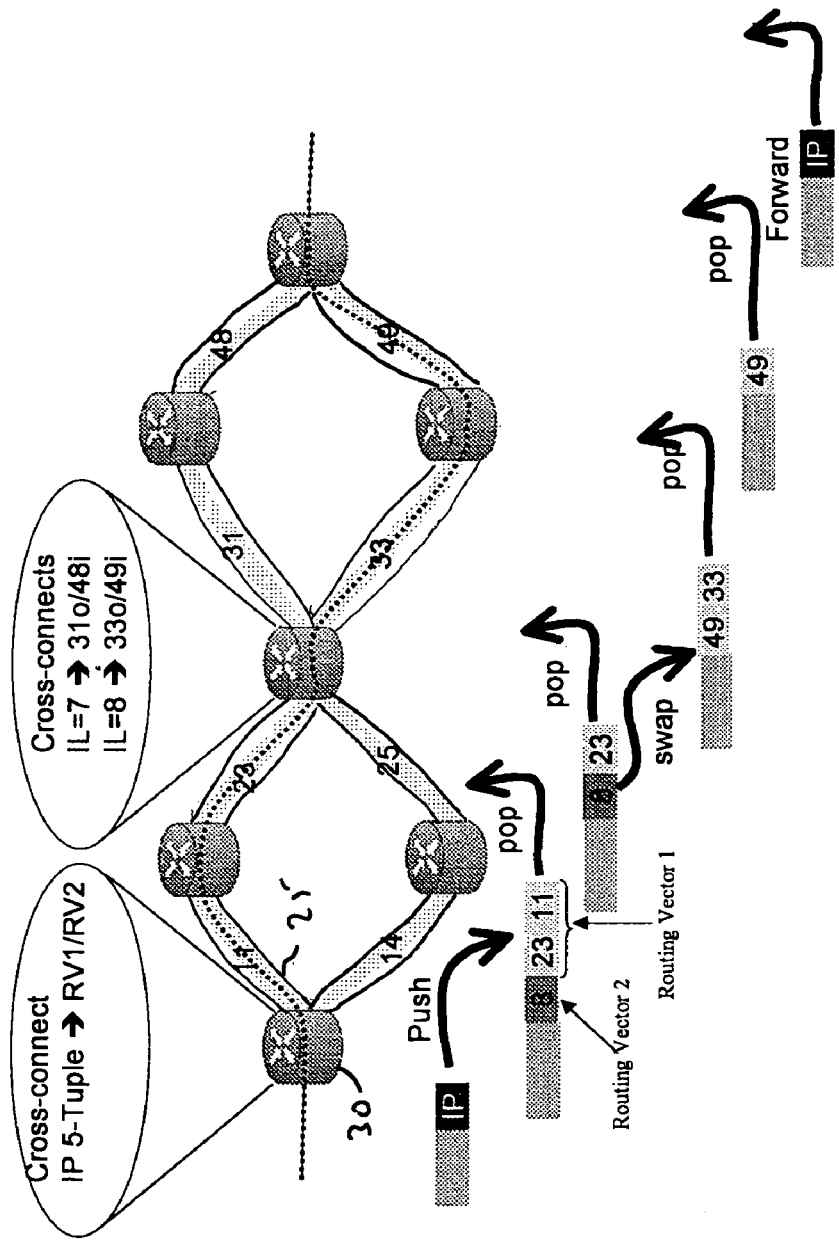
FIG. 6 shows the end to end label stack manipulation functions.

Use the label assigned to an MPLS LSP as a vector quantity
Use a stack of such labels to form a vector describing path across a network
For paths across the illustrated network, the following label stacks would be used:
A to D→2$i$<>2$o$/4$i$
B to C→1$i$<>1$o$/3$i$
B to D→1$i$<>1$o$/4$i$
Per-LSP bandwidth monitoring permits accurate edge allocation of traffic to each path vector The label manipulation functions are illustrated in FIG. 6. The overall process is one of end-to-end Session Admission Control. If the session flows are policed at A (FIG. 5), then the QoS experienced for the session can be equivalent to that achieved by ATM (Asynchronous Transfer Mode). The key difference being that there is no requirement for a per session connection control signalling function. Alternatively, if the Layer 1 LSPs (label switched paths) are being used for IP Routing then a traffic contract is provided at IP Layer 2 between the nodes but the individual IP Layer 3 routes compete for use of the bandwidth.

AUTODISCOVERY AND IP ROUTING IN VIRTUAL NETWORKS

The operation of Virtual Private Routed Networks is described in Informational RFC2764. Two schemes are currently being developed and deployed. A Virtual Router scheme is also described in RFC2764 whereas an alternative method based on extensions to BGP4 is described in Informational RFC2547.

This section is based on the Virtual Router method; the RFC2547 method could also be modelled.

Figure 3:
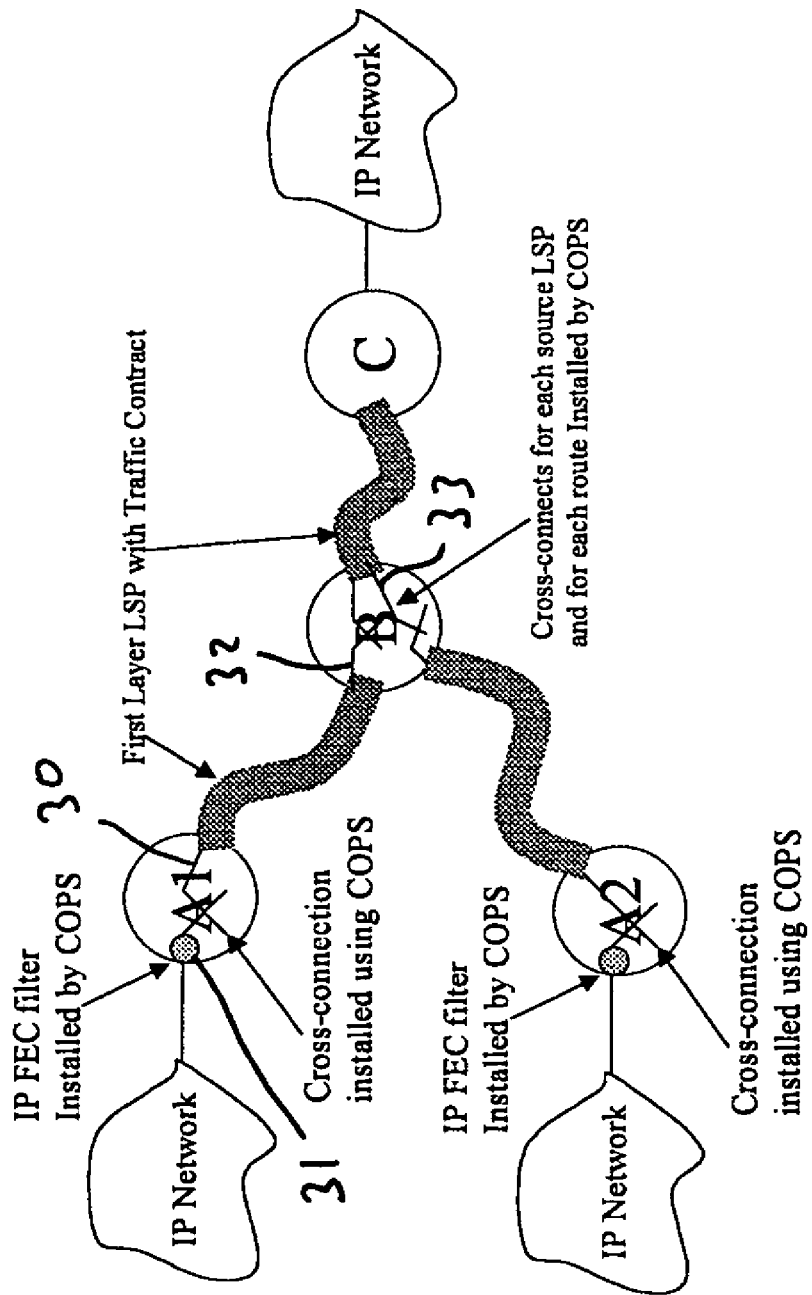
FIG. 3 is a schematic diagram of a network based on MPLS source routing.
Figure 7:
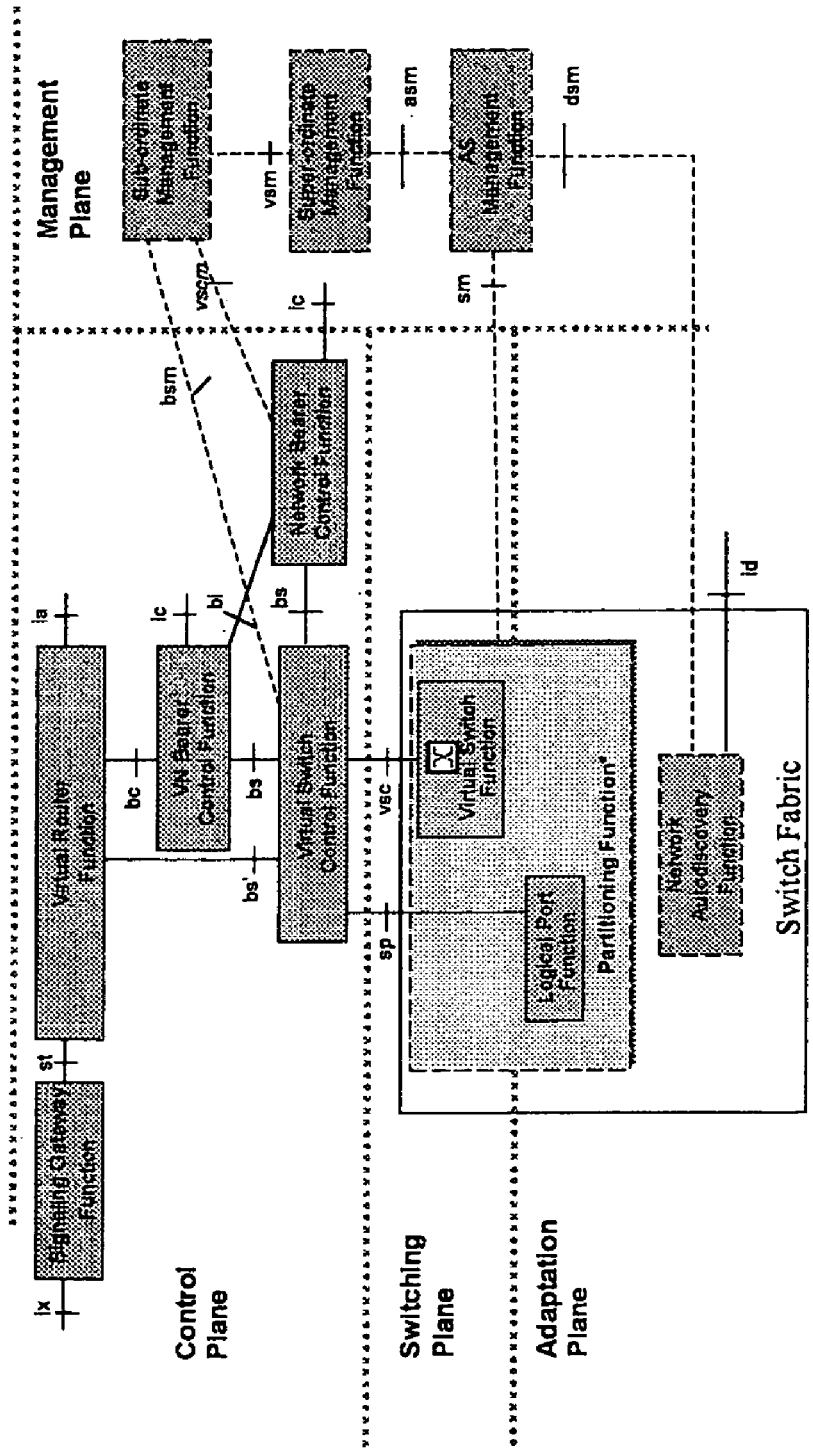
FIG. 7 shows a functional model of virtual router operation.

A part of the MSF functional model is illustrated in FIG. 7 in which an example of an NSICF is termed a Virtual Router Function (VRF) for clarity. The VRF 71 receives external routing protocols such as OSPF (open shortest path first), IS—IS or BGP4 via a signalling gateway function 72 over the st reference point. This functional model may be used to install routes in the MSF Virtual Network as illustrated in FIG. 3. The first layer LSPs are installed as described above. The cross-connects and IP Filters are installed by the VRF.

The operation of this functional model is as follows:
A Virtual Network is established using dynamic partitioning as described above. The installation process provides an output label for the LSP at its source which is also the input label at its destination.
The virtual router function (VRF) 71 receives routing protocol information and decides on the routes that it needs to install, for each route cross-connections are established at all the points of convergence of all of the LSPs that form components of the source routed multipoint to point path.
IP Filters are installed at each input port for each forwarding equivalence class (FEC) and are cross-connected into the Label stack which defines the multipoint-to-point series of LSPs for that route. This is done using VSCF over the bs reference point.
The VSCF installs the IP Filter using the sp reference point and the cross-connect is installed using the vsc reference point.

MPLS IMPLICIT SESSION SWITCHING WITH QOS GUARANTEES

Figure 8:
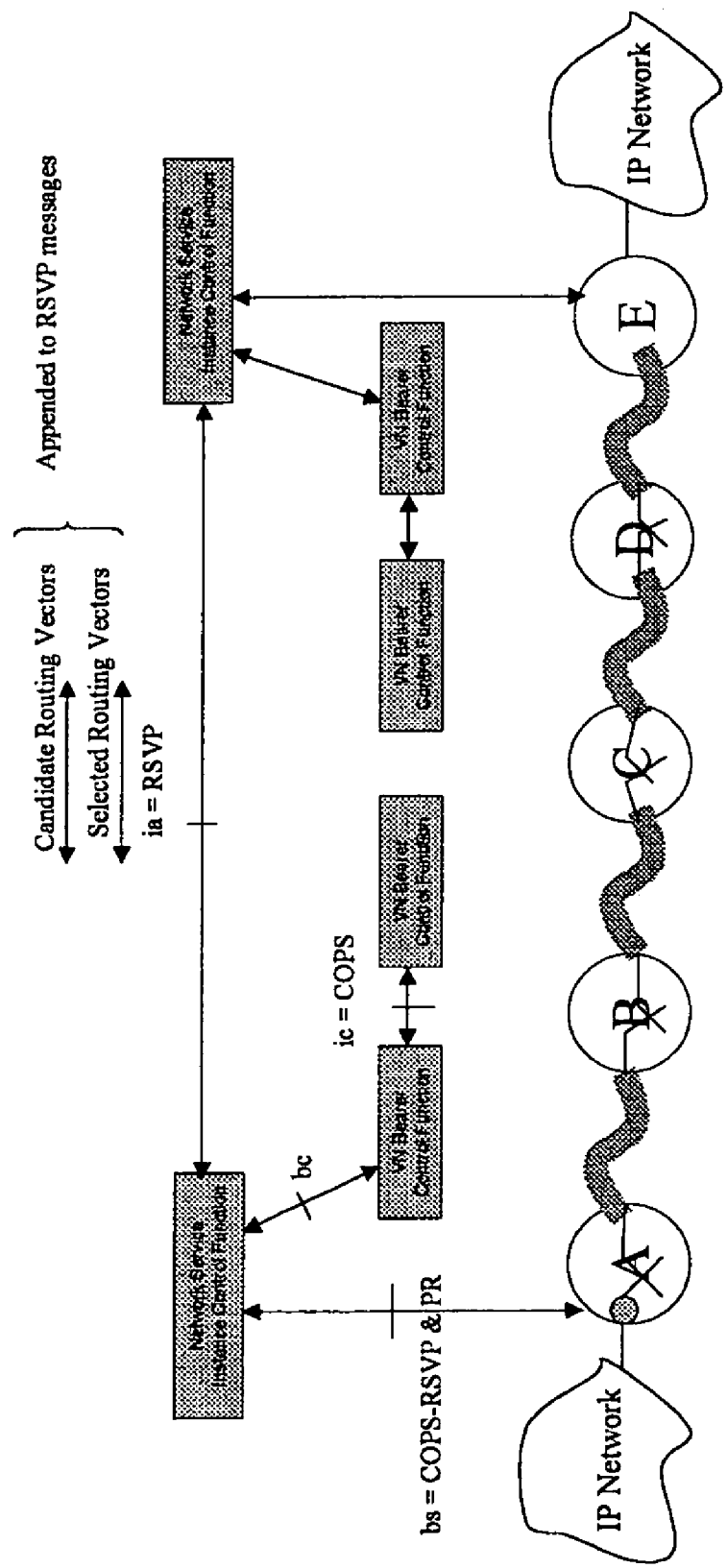
FIG. 8 shows RSVP (resource reservation protocol) service and bearer control in a five stage network.

The MSF control plane for the QoS (quality of service) guaranteed RSVP Service is illustrated in FIG. 8 which illustrates RSVP service and bearer control in a five stage network.

The end-to-end RSVP service is implemented by an NSICF (not in service for incoming call function) at each end supported by a VN-BCF (virtual network bearer control function) for each LSP. VN-BCFs communicate in pairs so as to be aware of resource availability for routing vectors. RSVP messages are trapped and passed to the NSICF using COPS-RSVP. A small number of candidate routing vectors are appended to the RSVP message and forwarded over the ia reference point, these are compared with resource availability from C→E and a pair of Vectors is selected and appended to the return RSVP message. COPS-PR is then used to install the 5-tuple IP filter and to cross-connect it to the selected routing vectors. The ia reference point is realized by returning the RSVP message encapsulated in COPS to the PEP at A where it is forwarded over the source route established for its FEC by the Virtual Routing function. The RSVP message is then trapped at E and forwarded to its NSICF.

Figure 9:
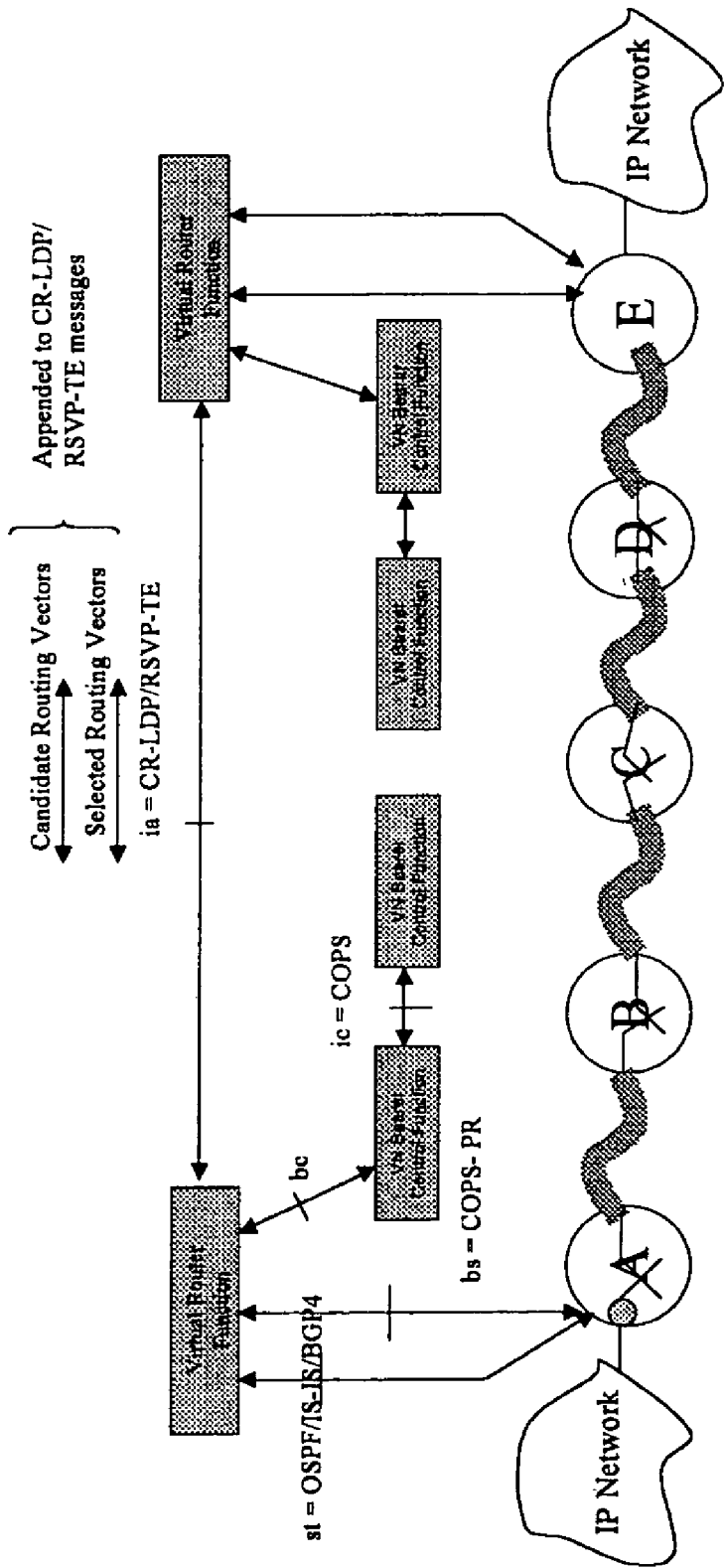
FIG. 9 illustrates the method of establishing IP routes using routing vectors.

In an exactly similar fashion, it is possible to use routing vectors in order to establish IP routes having traffic engineering constraints. This is illustrated in FIG. 9. The two virtual routers 91a, 91b at either end exchange label mapping messages carrying routing vector information. Routing vectors could be selected on the basis of traffic attributes learnt from monitoring actual traffic to select e.g. a least congested path. Traffic engineering can then be effected by rerunning the route selection process to avoid paths that are experiencing congestion.

The can be compared with the Inter-domain Policy Routing (IDPR) of RFC1478/1479. Indeed the ia interface could be based on the path establishment messages of IDPR.

SIGNALLING DETAILS

We now expand upon the details of the signalling required to achieve the above integration of RSVP with source-based routing described in FIG. 9 and taking the virtual router model described in FIG. 7 as a basis for the functional elements. We will assume that the IP networks at either side of the MPLS core use RSVP-based reservation to achieve QoS and that both user endpoints also use RSVP signalling. For the purposes of simplicity, we will only illustrate the signalling required to establish the forward path across the network. It will be understood that the reverse path is established in a similar manner.

No assumptions are made about the session signalling that might be associated with this RSVP signalling, nor about how it might be integrated into the reservation process.

There are two possible models for this mechanism. The first assumes that the source virtual router can resolve the IP address of the destination virtual router when the Path message arrives, based on the called party's IP address. The second method presents a call flow of r circumstances when this is not achievable.

DESTINATION VIRTUAL ROUTER RESOLVABLE

Figure 10:
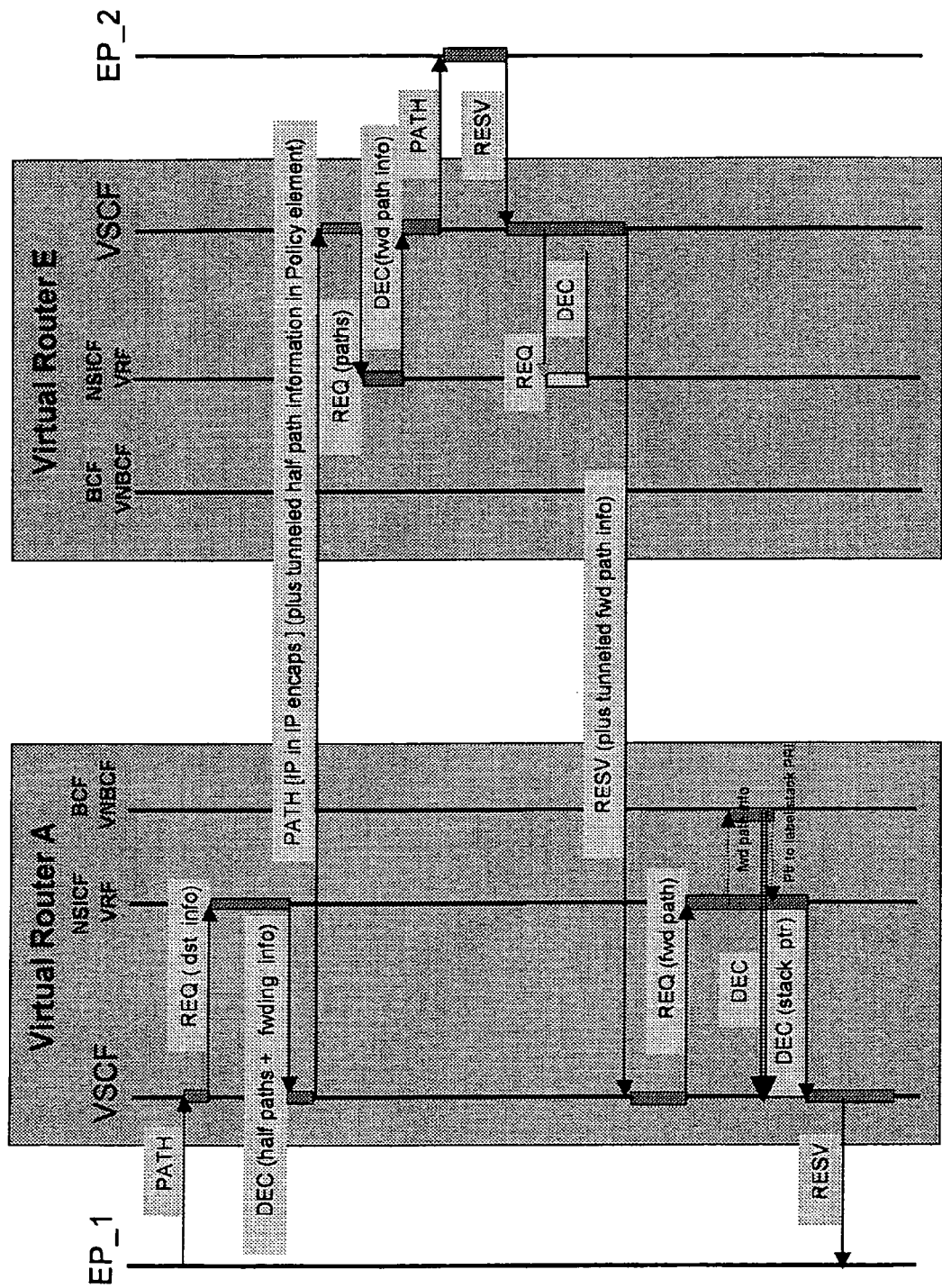
FIG. 10 illustrates a routing vector selection sequence for a selectable destination.

Referring now to FIG. 10, the reservation process is initiated by Endpoint 1 (EP_1) by sending a Path message. This is trapped by the VSCF at Virtual Router A that is operating as a Policy-based RSVP router. This triggers a COPS-RSVP Request (REQ) message and this may include any local Policy information from the access IP network. It must also include the information about the destination Endpoint (EP_2) so that the VRF can make a route selection decision.

The virtual router function (VRF) now determines a set forward half-paths to the nodes denoted as C in FIG. 10. These half-paths are determined using the processes described above. Once determined, this set is communicated back using a Decision (DEC) message that also includes the IP address of the virtual router. This is required as the path selection will have been made with a particular exit point from the MPLS network in mind and it is to this exit point that the Path message must be sent to establish the RSVP state.

To ensure that RSVP state is established at the correct exit point from the MPLS network, the Path message is IP encapsulated taking the IP address of the destination Virtual Router (according to RFC 2003) and the half path information added in the Policy part of the RSVP message. It is sent to virtual router E where it is processed by the VSCF. The Policy elements are stripped out and their contents communicated to the VRF in a DEC. The VRF at Virtual Router E now has sufficient information to make a choice of the Routing Vector across the network. This is communicated back in the DEC message back to the VSCF. Note that if no Routing Vector was found, the DEC will communicate this and the VSCF will send a PathTear to the previous hop (phop) RSVP router (Virtual Router A) to clear down the reservation.

If a routing vector has been determined, the VSCF sends the Path message onwards (without the path selection Policy information) across the IP network to Endpoint 2 (EP_2). Assuming the TSpec in the Path message can be accommodated, EP_2 responds with a Resv message. This is forwarded back across the IP network until it reaches Virtual Router E. At this point another REQ and DEC exchange occurs. The Resv message is then sent back to virtual router A with the routing vector information contained in the Policy Data element of the Resv. This time there is no need for IP encapsulation as Virtual Router A is stored as the phop and this address is used as the destination for the Resv message.

When the Resv reaches virtual router A, the VSCF removes the chosen routing vector information. This is communicated to the VRF in a REQ. The VRF now uses the bc interface to communicate the chosen path to the VN BCF. The VN BCF then sends a COPS-MPLS DEC to the VSCF, however note that this updates the COPS-MPLS PIB. A pointer must therefore be added to the Path State Block established by the RSVP messaging to the label stack to be used for forwarding subsequent RSVP messages. This information is communicated in the COPS-RSVP DEC from the VRF to the VSCF.

This done, the VSCF now forwards the Resv message to EP_1 to complete the RSVP exchange.

DESTINATION VIRTUAL ROUTER NOT RESOLVABLE

Figure 11:
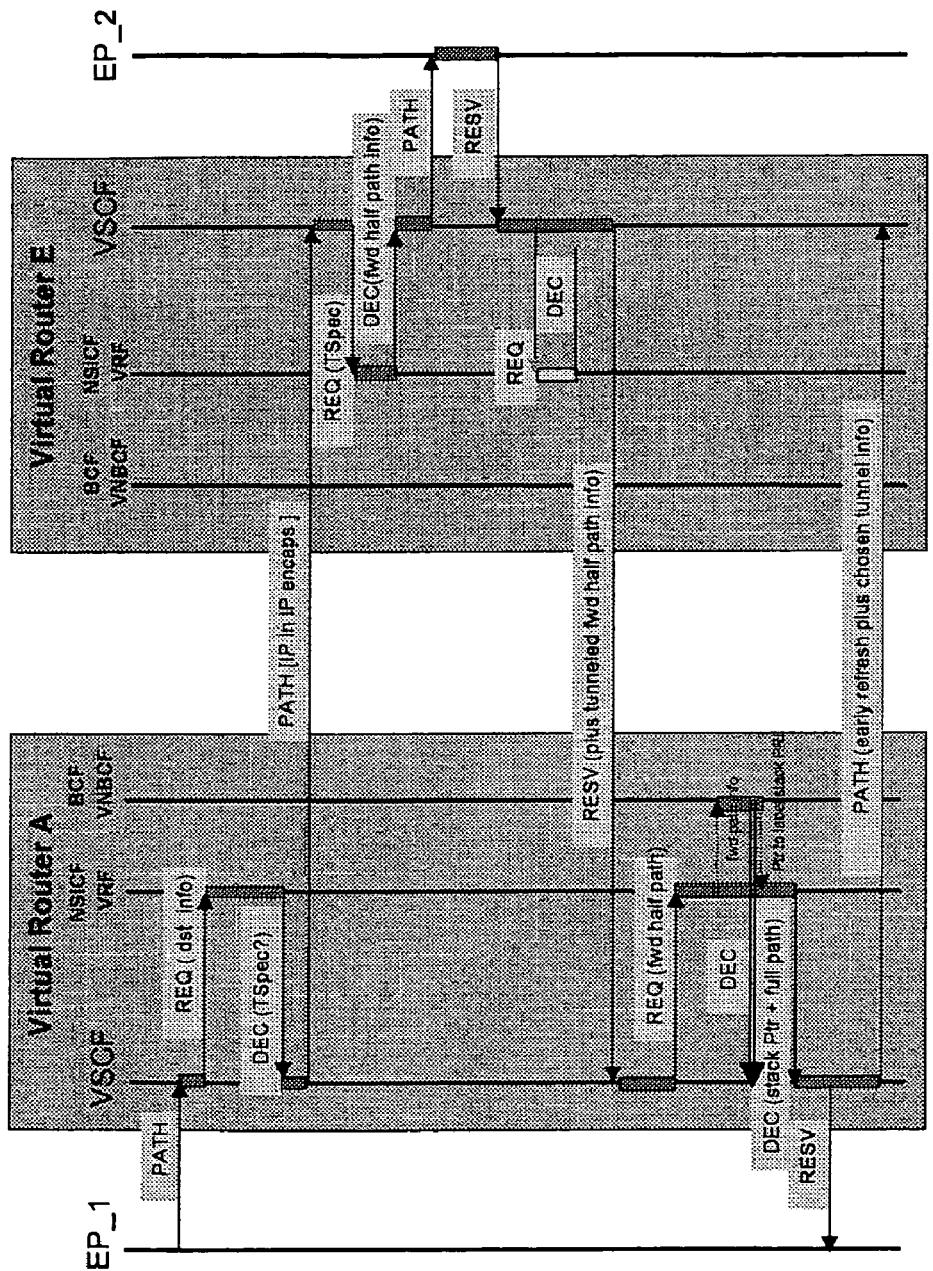
FIG. 11 illustrates a routing vector selection sequence for a non-selectable destination.

In this call walkthrough it is assumed that the destination Virtual Router is not resolvable by Virtual Router A. The call signalling sequence is very similar to the previous example and is illustrated in FIG. 11. EP_1 again begins with a Path message that triggers a REQ at the VSCF of Virtual Router A. This time the DEC just returns normal RSVP Policy information such as a revised TSpec based on the SLA of the user and also the instruction to IP encapsulate the Path message. The VSCF thus IP encapsulates the Path message and forwards it across the MPLS core—this is performed to inhibit any interaction the RSVP message might have with the core of the network, especially if the core is running RSVP-TE.

When the Path message reaches virtual router E, it is decapsulated and the VSCF generates a REQ to the VRF that includes the TSpec for the reservation and the address information of virtual router A (this is determined from the phop information in the Path message). The VRF now has to determine the set of second half paths from the virtual router C nodes that are reachable by virtual router A and have paths to virtual router E. Path selection is thus happening in the exact opposite manner to that presented above. The chosen half-routing vectors that satisfy these constraints are returned in the DEC message.

The Path message is forwarded to the called party (EP_2) and a Resv is returned. Again a REQ-DEC sequence is performed at virtual router E and the Resv is then forwarded across the MPLS core with the half-routing vector information included in the Policy Data element of the message. (Note that the half-path determination can also be performed at this juncture, based on the TSpec returned by the called party.) As above, the Resv does not need to be encapsulated as it uses the IP address of Virtual Router A as its destination.

When the Resv reaches the VSCF of virtual router A, it sends a REQ to the VRF that includes the half-routing vector information and the flow filter. The VRF now performs a route selection and communicates its decision to the VNBCF. This sends a COPS-MPLS DEC message that maps the flow filter onto the correct label stack (for robustness, this filter may also contain a pointer to the Path State Block formed by RSVP that relaters to this flow). The VNBCF also sends a pointer to the label stack back to the VRF which communicates this, along with the chosen routing vector information to the VSCF. The Path State Block is updated to include this label stack pointer as before. The Resv is now forwarded back to EP_1 and an early Path refresh is sent to virtual router A that includes the chosen routing vector information.

The early refresh is important as virtual router E needs to know which of its selected candidate half-paths was chosen and thus now has a reduced capacity, as this impacts all future half-path decisions. However, note that this early Path refresh only happens once and that the overall refresh rate is not affected.

It will be understood that the above description of a preferred embodiment is given by way of example only and that various modifications may be made by those skilled in the art without departing from the spirit and scope of the invention.

What is claimed is:

1. A method of routing traffic in a label switched packet network in which label switched paths (LSPs) are installed between nodes of the network, the method comprising defining and installing partial routes in the network, each partial route comprising at least two LSPs with a pre-installed cross-connection in a node at each end of the at least two LSPs such that an end-to-end route across the network can be defined as the concatenation of two of said partial routes.

2. A method as claimed in claim 1, wherein said network is partitioned into a plurality of autonomous system regions.

3. A method as claimed in claim 2, wherein the partial routes are selected based on congestion measurements.

4. A method as claimed in claim 1, wherein said LSPs and partial routes are installed via a common open policy service protocol.

5. A method of operating a multi-protocol label switched packet network, the method comprising partitioning the network by using constraint based routing to install label switched paths (LSPs) between nodes of the network; defining and installing partial routes in the network, each partial route comprising at least two LSPs with a pre-installed cross-connection in a node at each end of the at least two LSPs; wherein a label stack installed at an edge of the network acts as a source route such that the pre-installed cross connections enable dynamic multiplexing of sessions into the LSPs at a higher label level.

6. A method as claimed in claim 5, wherein the partial routes are selected based on congestion measurements.

7. A method as claimed in claim 6, wherein said partial routes include cross connections in label switching nodes.

8. A method as claimed in claim 7, wherein said LSPs and partial routes are installed via a common open policy service protocol.

9. A method as claimed in claim 5, and embodied as software in machine readable form on a storage medium.

10. A method of signalling to provide routing in a multi-protocol label switched packet network, the method comprising; sending a path message from an end point to a first virtual router; determining a first half path from the first virtual router across the network towards a second virtual router; forwarding an identity of said first half path to the second virtual router; determining a second half path across the network which together with the first half path defines a path across the network between the first and second virtual routers; determining a routing vector for said path across the network; and returning information identifying said routing vector to the first virtual router, wherein each of said half paths comprises a partial route installed in the network, each partial route comprising at least two label switched paths (LSPs) with a pre-installed cross-connection in a node at each end of the at least two LSPs.

11. A method of signalling to establish an end to end path in a multi-protocol label switched packet network, the method comprising sending a path message from an end point to a first virtual router; encapsulating the path message within a resource reservation protocol (RSVP) message and transmitting the RSVP message to a second virtual router, said path information being carried within a RSVP policy element in said RSVP message; determining a second half path across the network towards the second virtual router; determining routing vector information for said second half path; communicating said vector information to the first virtual router; determining a first half path which together with the second half path defines a path across the network between the first and second virtual routers; wherein each of said half paths comprises a partial route installed in the network, each partial route comprising at least two label switched paths (LSPs) with a pre-installed cross-connection in a node at each end of the at least two LSPs.

12. A label switched communications packet network in which label switched paths (LSPs) are installed between nodes of the network, the network including path selection means for defining and installing partial routes in the network, each partial route comprising at least two LSPs with a pre-installed cross-connection in a node at each end of the at least two LSPs such that an end-to-end route across the network can be defined as the concatenation of two of said partial routes.

13. A packet network as claimed in claim 12, wherein said network is partitioned into a plurality of autonomous system regions.

14. A packet network as claimed in claim 13, wherein the partial routes are selected based on congestion measurements.

15. A packet network as claimed in claim 14, wherein said partial routes include cross connections in label switching nodes.

16. A packet network as claimed in claim 15, wherein said LSPs and partial routes are installed via a common open policy service protocol.

17. A packet network as claimed in claim 16, and incorporating signalling means for sending path reservation requests as tunnelled resource reservation protocol (RSVP) messages between first and second virtual routers.

18. A virtual router embodied as software in machine readable form on a storage medium and arranged to route traffic in a packet network in which label switched paths are installed between nodes of the network, the software being arranged to define and install partial routes in the network, each partial route comprising at least two LSPs with a pre-installed cross-connection in a node at each end of the at least two LSPs such that an end-to-end route across the network can be defined as the concatenation of two of said partial routes.

* * * * *